(No Model.) 2 Sheets—Sheet 1.

C. R. JOHNSON.
APPARATUS FOR GUMMING SAWS.

No. 463,424. Patented Nov. 17, 1891.

WITNESSES
Carroll J. Webster
Gertrude Gifford

INVENTOR
Charles R Johnson
By William Webster
Atty (No Model.) 2 Sheets—Sheet 2.
C. R. JOHNSON.
APPARATUS FOR GUMMING SAWS.
No. 463,424. Patented Nov. 17, 1891.
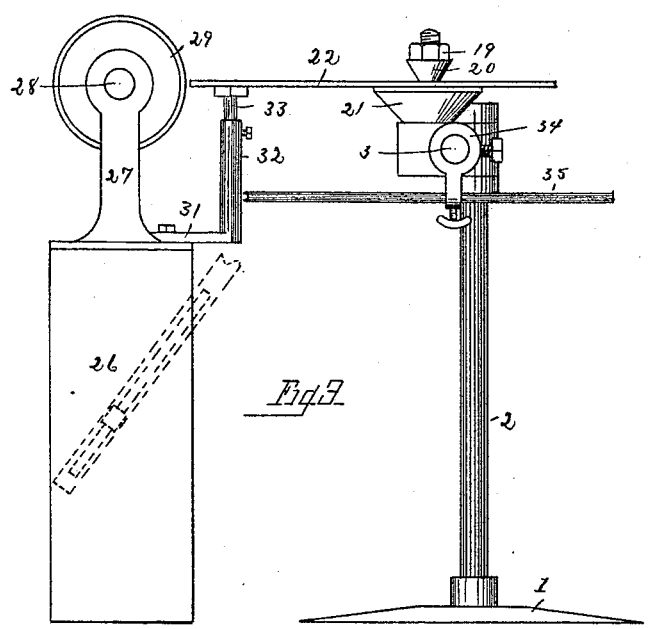
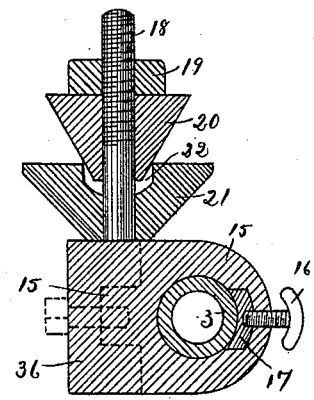
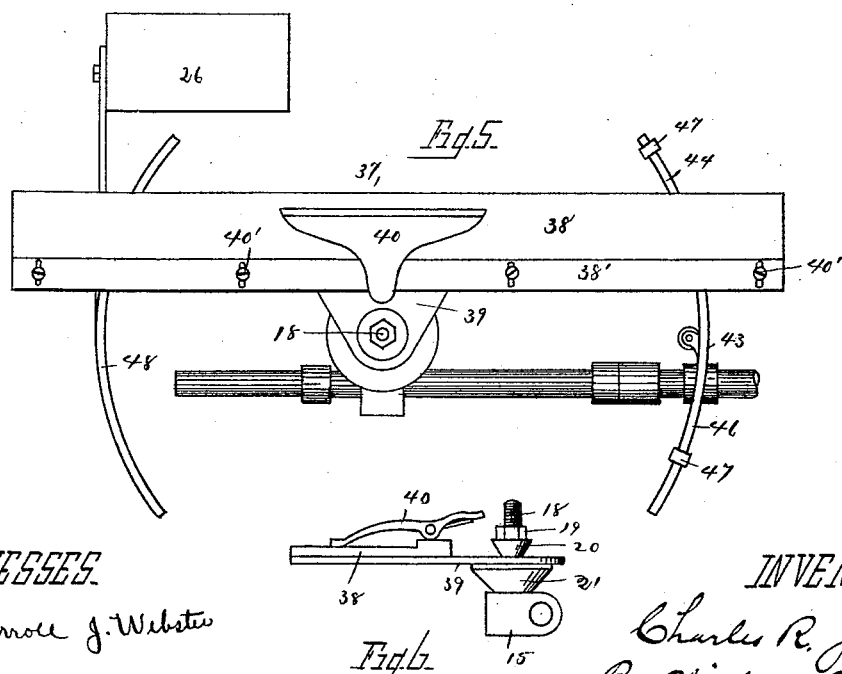
WITNESSES
Carroll J. Webster
Gertrude Gifford
INVENTOR
Charles R. Johnson
By William Webster
Atty

UNITED STATES PATENT OFFICE.

CHARLES R. JOHNSON, OF TOLEDO, OHIO.

APPARATUS FOR GUMMING SAWS.

SPECIFICATION forming part of Letters Patent No. 463,424, dated November 17, 1891.

Application filed January 24, 1891. Serial No. 378,988. (No model.)

*To all whom it may concern:*

Be it known that I, CHARLES R. JOHNSON, of Toledo, county of Lucas, and State of Ohio, have invented certain new and useful Improvements in Apparatus for Gumming Saws; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to an apparatus for gumming saws, and has for its object to provide mechanism whereby the interdental spaces of worn saws may be expeditiously and uniformly deepened to form the teeth with the proper length and shape.

A further object is to provide an apparatus by which either a circular drag or cut-off saw may be gummed.

The invention consists in the parts and combination of parts hereinafter described, and pointed out in the claims.

Figure 1:
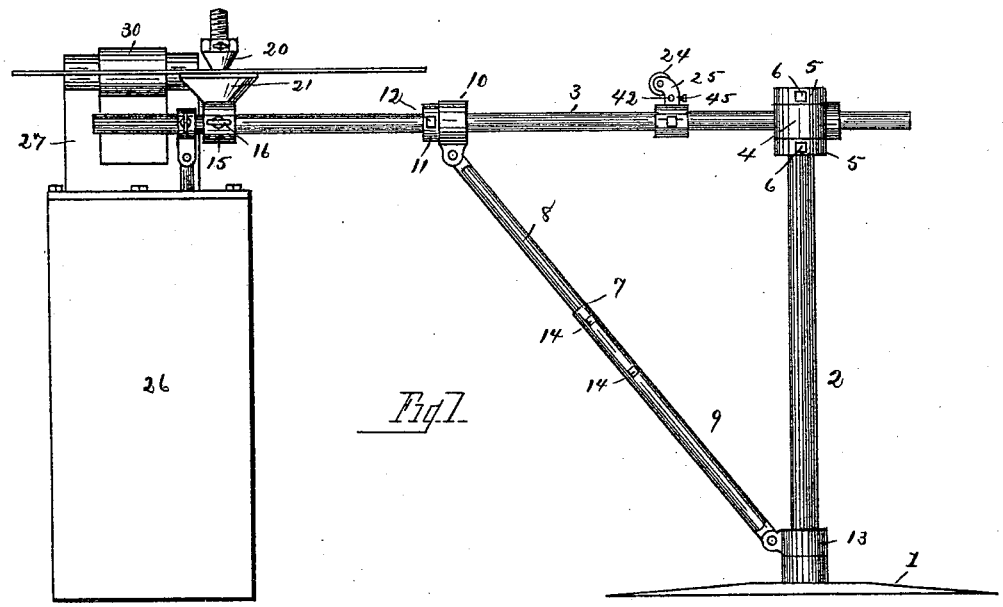
Figure 2:
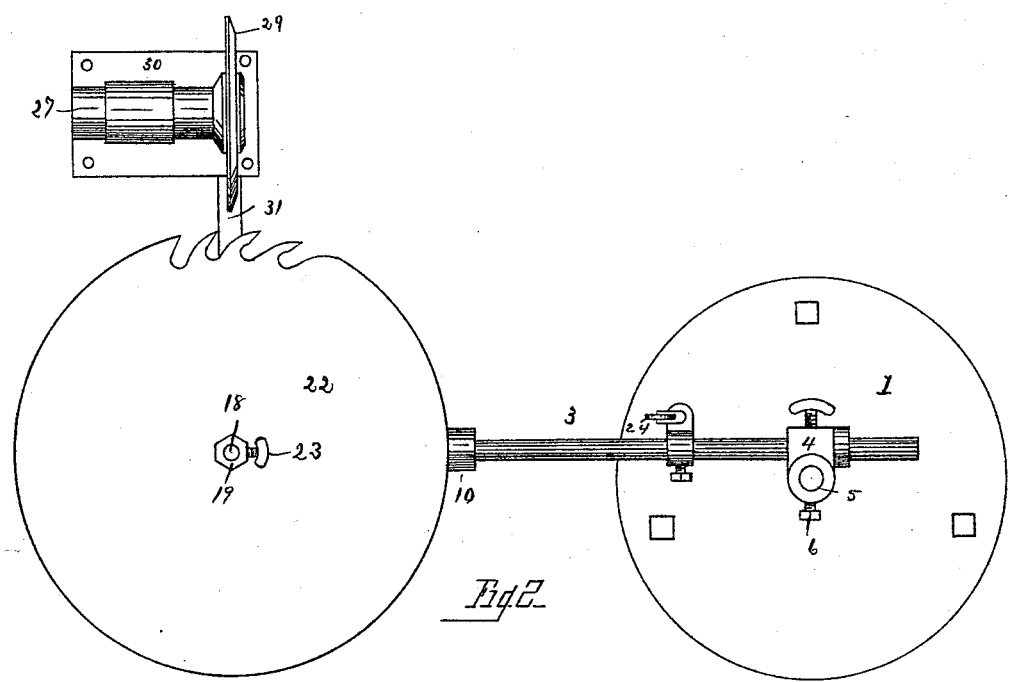

In the drawings, Figure 1 is a side elevation of the apparatus with a circular saw in position to be gummed. Fig. 2 is a plan view of the same, and Fig. 3 is an end view. Fig. 4 is a sectional detail view of the arbor upon which the saw is mounted, also showing the sliding boss upon which the arbor is secured. Fig. 5 is a plan view of the clamp for holding a drag or cut-off saw while being gummed, and Fig. 6 is an end view of the same.

The base 1 of the machine is firmly secured to the floor and supports a vertical standard 2, upon which is revolubly secured a horizontal arm 3, secured in a box 4, journaled on standard 2, and held in horizontal adjustment by means of collars 5, secured to the standard by set-screws 6, whereby the collars may be moved upon the standard to vary the height of arm 3.

7 designates an adjustable brace composed of upper and lower sections 8 and 9, respectively, the upper section being secured in a hanger 10 upon arm 3, held in adjustment upon said arm by means of a collar 11, held from movement thereon by a set-screw 12. The lower section 9 is secured in a revoluble collar 13, secured on standard 2 at the base thereof. The two sections 8 and 9 are held in telescopic adjustment as to the length of the brace by means of set-screws 14. By the arrangement described arm 3 may be adjusted vertically upon standard 2 by moving collars 5 up or down, and the arm brought into horizontal alignment by either adjusting brace 7 to the desired length or moving collar 11 upon arm 3. The arm 3 also has a free swing rotatively upon standard 2 and can also be revolved within box 4 and hanger 10. Upon the outer end of arm 3 is movably secured a boss 15, held to any desired adjustment by means of a set-screw 16, which bears upon a block 17 and causes the same to frictionally contact with the arm.

18 designates an arbor secured in boss 15, the upper end being screw-threaded to receive a nut 19. Upon arbor 18 are arranged upper and lower inverted-cone-shaped plates 20 and 21, respectively. The plate 21 is formed with a circular depression 22, into which the conical end of the plate 20 projects when passed into the central orifice of the saw 22, placed between the plates and held firmly upon the flat upper side of plate 21, being properly centered with relation to the arbor by the conical end of plate 20 when caused to bear upon the saw by nut 19, the nut being held from unscrewing by means of a set-screw 23.

24 designates a roller journaled in a swiveled hanger 25, movably mounted upon arm 3 and provided with a set-screw by which to secure the collar fixedly upon the arm, this roller being designed for use in supporting the outer edges of saws of large diameter and also to hold a rest to support straight saws.

26 designates a pedestal, upon which is mounted a pillow-block 27, in which is journaled a shaft 28, upon which is secured a grinding-wheel 29, preferably of consolidated emery, the shaft 28 receiving motion from a belt (not shown) running upon pulley 30. Secured to the pillow-block is an angular bar 31, the vertical portion 32 of which is tubular to receive a vertically-adjustable rest 33, upon which that portion of the periphery of the saw in contact with the grinding-wheel is supported. Secured upon the end of arm 3 is a hanger 34, in which is secured a gage 35, which may be adjusted to the desired length to contact with upright portion 32 of bar 31 to regulate the distance the saw may be moved toward the grinding-wheel, thereby determining the depth of the cut of the same.

Thus far I have described the invention as applied to gumming a circular saw, and to render the operation more clear will explain the same briefly and afterward describe the operation of gumming a drag or cut-off saw.

The saw is placed upon plate 21 with the lower surface resting upon the broad circular upper face thereof. Plate 20 is now placed upon the mandrel with the apex of the truncated cone downward and entering into the central hole of the saw, thereby centering the saw with relation to the mandrel. Nut 19 is now run down with sufficient pressure to hold the saw firmly and yet not sufficiently tight to cause plate 20 to bind with friction enough to prevent the saw being revolved by the operator when desired. Set-screw 23 is turned to hold nut 19 from turning. The arm 3 is now adjusted to the required height relative to grinding-wheel 29 and also adjusted relative to length, so that the grinding-wheel will enter the interdental spaces between the teeth of the saw. The bar 31 is adjusted laterally and the rest 33 vertically to properly support the saw, when the operator grasps arm 3 and swings the same to cause the grinding-wheel to remove the metal between the teeth until gage 35 contacts with the vertical portion 32 of bar 31, when arm 3 is swung in a reverse direction and the saw given a sufficient turn to cause the grinding-wheel to pass between the two next succeeding teeth, and the operation just described is repeated until the entire saw has been gummed. In order to provide for grinding a bevel to the teeth, I may secure the mandrel 18 in a block 36, journaled on boss 15, as shown in dotted lines in Fig. 4, and ordinarily prefer this construction when adapting the apparatus for the purpose of gumming cut-off saws, where a determinate bevel to the teeth is desirable. In this construction I may oscillate the saw (either circular, drag, or cut-off) to any desired degree. It will be seen that by reason of the axial movement of the saw when arm 3 is swung I give to the teeth the desired hook, and that I may turn the saw on the mandrel to form the teeth in any desired shape.

In adapting the apparatus for use in gumming a straight saw I employ a clamp 37, comprising a base-board 38, having a plate 39, perforated to receive mandrel 18 and be secured, as in the case of a circular saw, and provided with a spring-pressed clip 40 to frictionally bear upon the saw-blade and yet allow the same to be moved longitudinally of the board to cause each intermediate space between the teeth to register with the grinding-wheel. The base-board 38 is provided with a parallel strip 38', provided with elongated slots, through which thumb-screws 40' pass to allow of an adjustment to compensate for saws of varying widths. The clamp being secured upon the mandrel, as shown in Fig. 5, and the saw secured upon board 38 by clips 40, the operation of gumming a drag-saw is the same as has been described. The radial movement of the arm 3 and the movement of the frame on the mandrel allow the operator to give any desired form of tooth or hook to the tooth. To properly support the base-board of the clamp, the collar 25 is given a one-half turn on arm 3 to allow perforation 42, formed therein, to receive the standard 43 of a T-shaped rest 44, which is adjusted to the desired height and secured by a set-screw 45, the horizontal arm 46 of the rest being provided with stops 47 to limit the rotative movement of the base-board upon the mandrel, thereby insuring a uniform shape to each tooth, the opposite end of the base-board being supported by a rest 48, adjustably secured to the pedestal.

In gumming a cut-off saw the set-screw 23 is unscrewed and the block is allowed to rock on its journal to give the desired bevel to the teeth. While I have described this last operation of allowing a rocking motion as only applicable to cut-off saws, it will be apparent that I may use the same motion in gumming some forms of circular or drag saws. In gumming circular saws of large diameter the hanger 25 is moved upon arm 3 a sufficient distance to support the same.

It will be seen that by my construction but few parts are employed, thereby rendering the same inexpensive of construction, and that there is an adjustability to saws of any size or character.

What I claim is—

1. In a saw-gummer, a vertical standard, a horizontally and vertically adjustable arm carried thereby, an adjustable boss mounted on the free end of the said arm, an arbor carried by the boss, and a saw-fastening device carried by the arbor.

2. In a saw-gummer, a vertical standard, a horizontally and vertically adjustable arm carried thereby, an adjustable boss mounted on the free end of the said arm, an arbor carried by the boss, a saw-fastening device carried by the arbor, and an adjustable brace connecting the said arm and the standard.

3. In a saw-gummer, a wheel-frame and a grinding-wheel journaled therein, in combination with a vibratory saw-carrying frame and an adjustable rod carried thereby and adapted to contact with the wheel-frame to limit the movement of the saw-carrying frame.

4. In a saw-gummer, a wheel-frame, a grinding-wheel journaled therein, a standard carried by the frame, and a rest-pin adjustably mounted in the standard, in combination with a vibratory saw-carrying frame and an adjustable rod connected with the standard on the wheel-frame.

5. In a saw-gummer, a vertical standard, a horizontal arm carried thereby, a saw-fastener carried by the free end of the said arm, and an adjustable roller carried by the arm and adapted to support the saw.

6. In a saw-gummer, a standard, a radially-movable vertically and horizontally adjustable arm secured thereon, a boss adjustably secured upon the arm and provided with a mandrel, a plate upon the mandrel, adapted to support a saw, and an upper plate to rest upon the saw and be held in position by a nut upon the mandrel, in combination with a grinding-wheel journaled in the arc of the circle described by the radial movement of the arm.

7. In a saw-gummer, a device for holding a saw, comprising a mandrel, a centrally-perforated plate upon the mandrel, provided with an enlarged central recess, and an inverted-cone-shaped plate upon the mandrel, adapted to enter the central perforation in the saw and center the same with relation to the mandrel.

In testimony that I claim the foregoing as my own I hereby affix my signature in presence of two witnesses.

CHARLES R. JOHNSON.

Witnesses:
WILLIAM WEBSTER,
JACOB W. MELCHIOR.